United States Patent
Li et al.

(10) Patent No.: US 11,432,181 B2
(45) Date of Patent: Aug. 30, 2022

(54) METHOD FOR MEASUREMENT RELAXATION, USER EQUIPMENT, AND COMPUTER READABLE MEDIUM

(71) Applicant: GUANGDONG OPPO MOBILE TELECOMMUNICATIONS CORP., LTD., Guangdong (CN)

(72) Inventors: Haitao Li, Dongguan (CN); Cong Shi, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/476,294

(22) Filed: Sep. 15, 2021

(65) Prior Publication Data

US 2022/0007225 A1 Jan. 6, 2022

Related U.S. Application Data

(63) Continuation of application No. PCT/CN2020/130247, filed on Nov. 19, 2020.

(60) Provisional application No. 62/937,766, filed on Nov. 19, 2019.

(51) Int. Cl.
*H04W 24/10* (2009.01)
*H04W 72/10* (2009.01)

(52) U.S. Cl.
CPC ........... *H04W 24/10* (2013.01); *H04W 72/10* (2013.01)

(58) Field of Classification Search
CPC . H04W 72/10; H04W 72/082; H04W 72/048; H04W 72/1263; H04W 36/0088; H04W 72/085; H04W 24/10; H04L 5/0032
See application file for complete search history.

(56) References Cited

U.S. PATENT DOCUMENTS

| | | | | |
|---|---|---|---|---|
| 9,198,069 | B2 * | 11/2015 | Franklin | H04B 17/318 |
| 10,136,366 | B2 * | 11/2018 | Ku | H04W 36/30 |
| 10,716,047 | B2 * | 7/2020 | Meylan | H04W 48/16 |
| 11,012,930 | B2 * | 5/2021 | Gao | H04W 48/18 |
| 2018/0242208 | A1 | 8/2018 | Ku et al. | |
| 2020/0314868 | A1 * | 10/2020 | Tseng | H04B 17/318 |
| 2021/0076275 | A1 * | 3/2021 | Yiu | H04W 36/0088 |

(Continued)

FOREIGN PATENT DOCUMENTS

| | | |
|---|---|---|
| EP | 2393327 A1 | 12/2011 |
| WO | 2019118157 A1 | 6/2019 |

(Continued)

OTHER PUBLICATIONS

International Search Report dated Jan. 29, 2021 in App. No. PCT/CN2020/130247, dated Jan. 29, 2021, 2 pp.

(Continued)

*Primary Examiner* — Brian T O Connor
(74) *Attorney, Agent, or Firm* — Perkins Coie LLP

(57) ABSTRACT

A measurement relaxation method, a user equipment, a computer program and a computer readable medium are provided. The method includes: receiving, by User Equipment (UE), first information indicating that measurement relaxation on a high priority frequency is allowed; and performing, by the UE, measurement relaxation on the high priority frequency according to the first information.

20 Claims, 2 Drawing Sheets

--- receiving, by User Equipment (UE), first information indicating that measurement relaxation on a high priority frequency is allowed — S100 performing, by the UE, measurement relaxation on the high priority frequency accoding to the first information — S120

(56) References Cited

U.S. PATENT DOCUMENTS

2021/0105649 A1\* 4/2021 Lee .................... H04W 56/001
2022/0030455 A1\* 1/2022 Koskela ................ H04W 24/10

FOREIGN PATENT DOCUMENTS

WO 2019144398 A1 8/2019
WO 2019199391 A1 10/2019

OTHER PUBLICATIONS

"On Triggering RRM Measurement Relaxation", 3GPP TSG-RAN WG2 Meeting #107bis R2-1912459, Chongqing, China, Oct. 14-18, 2019, Oct. 18, 2019, 2 pp.
Extended European Search Report for European Application No. 20889524.3 dated May 2, 2022. 9 pages.
Intel Corporation "Relaxation of measurements" R2-1914847; 3GPP TSG RAN WG2 Meeting #108; Reno, NV, USA, Nov. 18-22, 2019. 5 pages.

\* cited by examiner

METHOD FOR MEASUREMENT RELAXATION, USER EQUIPMENT, AND COMPUTER READABLE MEDIUM

CROSS-REFERENCE TO RELATED APPLICATION

The present application is a continuation application of International Application No. PCT/CN2020/130247, filed on Nov. 19, 2020, which claims the priority of US provisional application U.S. 62/937,766. The present application claims priority and the benefit of the above-identified applications and the above-identified applications are incorporated by reference herein in their entireties.

TECHNICAL FIELD

The present disclosure relates to communication technology, in particular to RRM (Radio Resource Management) measurement relaxation.

BACKGROUND

The statements in this section merely provide information related to the present disclosure and may not constitute prior art. Further, the content in this section may be used to define a concept related to the disclosure.

In New Radio (NR) for $5^{th}$ Generation (5G) mobile communication technology, UE shall measure signals from one or more cells in a regular manner, which could be referred to as Radio Resource Management (RRM) measurement. However, if the UE is, for example, in low mobility and/or not at the cell edge, it is not necessary to keep the measurement in the regular manner, so as to save the power consumed by the measurement. That is, power of the UE can be saved by relaxing the RRM measurement, when one or more measurement relaxation criteria are satisfied, for example, the UE is in low mobility and/or not at the cell edge.

SUMMARY

Implementations of this application provide a measurement relaxation method, a User Equipment, a computer program and a computer readable medium, which can achieve both power saving and loading balance.

According to a first aspect, a method for measurement relaxation is provided, including: receiving, by User Equipment (UE), first information indicating that measurement relaxation on a high priority frequency is allowed; performing, by the UE, measurement relaxation on the high priority frequency according to the first information.

According to a second aspect, a user equipment (UE) is provided, including: a receiving unit, configured to receive first information indicating that measurement relaxation on a high priority frequency is allowed; a execution unit, configured to perform measurement relaxation on the high priority frequency according to the first information.

According to a third aspect, a user equipment (UE) is provided. The user equipment is configured to perform the method of the first aspect or any possible implementation of the first aspect.

According to a fourth aspect, a user equipment (UE) is provided, including: one or more storage medium storing computer readable instructions, and one or more computing processors configured to execute the computer readable instructions for performing the method of the first aspect or any possible implementation of the first aspect.

According to a fifth aspect, a computer program is provided, including instructions, when executed by user equipment, for causing the user equipment to perform the method of any of the first aspect or any possible implementation of the first aspect.

According to a sixth aspect, a computer readable medium is provided, including: instructions for causing user equipment to perform the method of any of the first aspect or any possible implementation of the first aspect.

Based on the foregoing technical solutions, a user equipment may receive first information indicating that measurement relaxation on a high priority frequency is allowed. Further, the user equipment perform measurement relaxation on the high priority frequency according to the first information, so that the user equipment can achieve both power saving and loading balance.

BRIEF DESCRIPTION OF THE DRAWINGS

The drawings are used merely for illustration purposes but not for limiting the disclosure.

DETAILED DESCRIPTION

Figure 1:
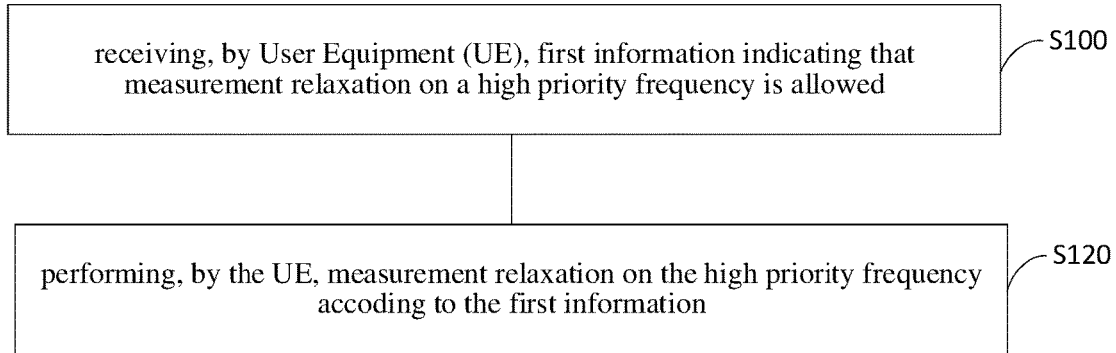
FIG. 1 is a schematic flowchart of a measurement relaxation method according to an implementation of this application.

Measurement relaxation criteria may consider at least one of low mobility and a user equipment (UE) location in the cell (e.g. whether the UE is at cell-edge).

A UE may, as an option, activate a relaxed measurement criterion (i.e., measurement relaxation criteria), if at least any of the following conditions are met:
a) Serving Cell measurement does not change more than a relative threshold during a time period
  LTE relaxed monitoring criteria in TS 36.304 may be considered as a baseline. Additional enhancements to address aspects that are specific to NR can be considered.
b) UE is not at cell edge, meaning that serving cell/beam RSRP/RSRQ/SINR is above a threshold, i.e., at least one of Reference Signal Received Power (RSRP), Reference Signal Received Quality (RSRQ), Signal to Interference plus Noise Ratio (SINR) of the serving cell/beam is above a respective threshold.

Further, the network side, e.g., a gNB and/or an eNB, may configure triggering criteria for measurement relaxation independently (i.e. either cell-edge or low mobility or both).

RRM measurement relaxation can be supported for low mobility UE and/or UE not at cell edge. For each situation, the detailed relaxation criterion or criteria and the UE measurement behavior when the criterion or criteria are satisfied need a further consideration.

For a low mobility UE, LTE measurement relaxation may be used as baseline, which can be summarized as follows: If the UE supports relaxed monitoring/measurement and a parameter $S_{SearchDeltaP}$ is present in system information such as a SIB3 (System Information Block 3), the UE may further limit the needed measurements in an RRC_IDLE (Radio Resource Control Idle) state, even when the RSRP of the serving cell is below S-thresholds. The UE may choose not to perform intra-frequency or inter-frequency measurement for up to 24 hours, when a relaxed measurement criterion, i.e., $(Srxlev_{Ref}-Srxlev)<S_{SearchDeltaP}$ for a period of $T_{SearchDeltaP}$, is fulfilled. As we all know, the relaxed measurement criterion is described in detailed in TS 38.304 5.2.4.9.1, i.e., This relaxed measurement criterion is a low mobility criterion for the UE, wherein Srxlev is a cell selection received level value of the serving cell of the UE (in this case it refers to a current Srxlev, or called as $Srxlev_{current}$); $Srxlev_{Ref}$ is a reference Srxlev value of the serving cell, and $S_{SearchDeltaP}$ is a threshold on Srxlev variation for measurement relaxation; $T_{SearchDeltaP}$ is a cell reselection parameter for specifying the Srxlev threshold for relaxed measurement. The Srxlev may be based on an RSRP, as we all know, which is described in detail in TS 38.304 5.2.3.2; i.e. $Srxlev=Q_{rxlevmeas}-(Q_{rxlevmin}+Q_{rxlevminoffset})-P_{compensation}-Qoffset_{temp}$, where $Q_{rxlevmeas}$ is measured cell rx level value (RSRP).

For a UE not at cell edge, a triggering criterion may be that a UE is not at cell edge if the serving cell/beam RSRP/RSRQ/SINR is above a threshold, i.e., if at least one of the RSRP, RSRQ, SINR of the serving cell/beam is above a respective threshold.

During a cell re-selection, for one or a plurality of NR inter-frequencies and/or one or a plurality of inter-RAT frequencies (inter Radio Access Technology frequencies) with cell reselection priority/priorities being high than the cell reselection priority of the frequency of the serving cell, the UE shall normally perform measurement(s) on the high-priority frequency/frequencies, i.e., on the one or the plurality of NR inter-frequencies and/or the one or the plurality of inter-RAT frequencies with high cell reselection priority/priorities.

Whether measurement on high-priority frequency/frequencies can also be relaxed may be configured by the network side, e.g., by a gNB and/or an eNB. For example, in a frequency list broadcasted by the network side (i.e., the UE's serving cell), for a high priority frequency, the network side may indicate whether a measurement relaxation can be performed by the UE when a measurement relaxation criterion is satisfied, wherein the measurement relaxation criterion may include (but not limited to) at least one of the following criteria: 1) not-at-cell-edge criteria; 2) low-mobility criteria.

In the above, measurement on a frequency may refer to measuring a reference signal sent by each cell on the measurement frequency. The information broadcasted may be in system information that may include, but is not limited to, at least one of a master information block (MIB) and a system information block (SIB), minimum system information (MSI), remaining minimum system information (RMSI) or other system information.

Figure 2:
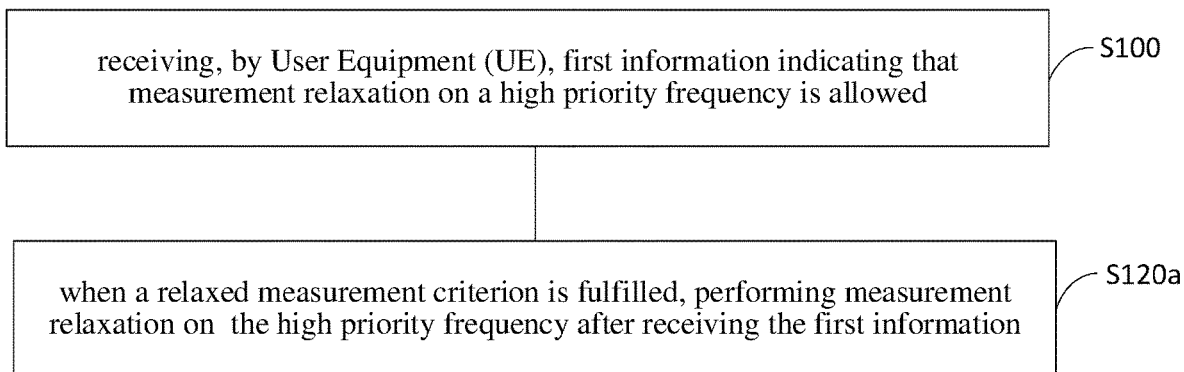
FIG. 2 is a schematic flowchart of a measurement relaxation method according to another implementation of this application.

The method may include receiving first information broadcasted by a network device, in step S100 of FIGS. 1 and 2. The method may include performing measurement relaxation on a high priority frequency if the UE measurement relaxation on the high priority frequency is allowed according to the first information, for example in step S120 of FIG. 1.

The method may include performing measurement relaxation on a high priority frequency after receiving the first information, when a relaxed measurement criterion is fulfilled, for example in step S120a of FIG. 2.

Optionally, in some implementations, the relaxed measurement criterion is fulfilled for a period. e.g., a measurement of the serving cell of the UE satisfies the relaxed measurement criterion for a period.

In this implementation of this application, the measurement of the serving cell includes least one of the followings: Reference Signal Received Power (RSRP), Reference Signal Received Quality (RSRQ), Signal to Interference plus Noise Ratio (SINR).

In this implementation of this application, the measurement of the serving cell of the UE satisfies the relaxed measurement criterion, which meaning that serving cell/beam RSRP/RSRQ/SINR is above a threshold, i.e., at least one of RSRP, RSRQ, SINR of the serving cell/beam is above a respective threshold.

Optionally, in some implementations, the relaxed measurement criterion is fulfilled for a period, which means that a relaxed measurement criterion, i.e., $(Srxlev_{Ref}-Srxlev)<S_{SearchDeltaP}$ for a period of $T_{SearchDeltaP}$, is fulfilled. As we all know, this relaxed measurement criterion may be a low mobility criterion for the UE, wherein Srxlev is a cell selection received level value of the serving cell of the UE (in this case it refers to a current Srxlev, or called as $Srxlev_{current}$); $Srxlev_{Ref}$ is a reference Srxlev value of the serving cell, and $S_{SearchDeltaP}$ is a threshold on Srxlev variation for measurement relaxation; $T_{SearchDeltaP}$ is a cell reselection parameter for specifying the Srxlev threshold for relaxed measurement, which is described in detailed in TS 38.304 5.2.4.9.1. As we all know, the Srxlev may be based on an RSRP, i.e., $Srxlev=Q_{rxlevmeas}-(Q_{rxlevmin}+Q_{rxlevminoffset})-P_{compensation}-Qoffset_{temp}$, where $Q_{rxlevmeas}$ is measured cell rx level value (RSRP), described in detailed in TS 38.304 5.2.4.9.1.

It should be noted that, the high priority frequency refers to a frequency whose cell reselection priority is higher than the cell reselection priority of the frequency of the serving cell.

It should be noted that, the high priority frequency refers to a frequency of an inter-frequency reselection or a frequency of an inter Radio Access Technology (inter-RAT) frequency reselection.

The method may further include performing normal measurement on a high priority frequency when the UE measurement relaxation on the high priority frequency is not allowed according to the first information regardless of whether the UE's serving cell RSRP/RSRQ/SINR measurement satisfies a measurement relaxation criterion or not.

In the above, measurement on a frequency may refer to measuring a reference signal sent by each cell on the measurement frequency point. The broadcast message carrying the first information may include, but is not limited to, at least one of a master information block (MIB) and a system information block (SIB), minimum system information (MSI), remaining minimum system information (RMSI) or other system information. The first information may be a cell reselection parameter highPriorityMeasRelax with a value of "true" in system information, e.g., in a SIB2.

Performing measurement relaxation on a high priority frequency may refer to UE not performing measurement on the high priority frequency.

Performing measurement relaxation on a high priority frequency may refer to UE performing measurement on the high priority frequency using a longer measurement period or sampling interval than normal measurement on a high priority frequency.

The network side may indicate a subset of the broadcasted high priority frequency list which can be measured by the UE when a measurement relaxation criterion is satisfied at the UE.

The network side may indicate a subset of the broadcasted high priority frequency list which UE is allowed not to measure when a measurement relaxation criterion is satisfied at the UE.

In view of the above, as an example, in a Narrow Band-Internet of Things (NB-IoT) or an Enhanced Machine-Type Communication (eMTC) system, the cell reselection priority of the measurement frequency is not distinguished in the idle (IDLE) state, so all frequency measurements can be relaxed together. The concept of frequency's reselection priority is still used in the 5G system, and regardless of the quality of the serving cell, user equipment may always perform cell search and measurement on the high priority frequency/frequencies, to meet the operator's demand for load balancing. However, for user equipment with a power saving requirement, always measuring high priority frequency points will increase power consumption.

With the disclosed method, according to the network side configuration, when a number of high priority frequency points (frequencies) are deployed in the same coverage (e.g., collocated in the same gNB) and belong to a same band, UE may just measure one or part of the frequency points so that UE does not need to measure the other frequency points. In this case, measurement relaxation may even also be performed for the high priority frequency points, so that the UE is capable of saving more power, and further the UE's reselecting to the cell with a high priority frequency will not be affected.

In addition, it is provided UE that is configured to perform one of the above methods.

Method implementations of this application are described above in detail with reference to FIG. 1 to FIG. 2, and apparatus implementations of this application are described below in detail with reference to FIG. 3. It should be understood that, the apparatus implementations and the method implementations correspond to each other. For similar descriptions, refer to the method implementations.

Figure 3:
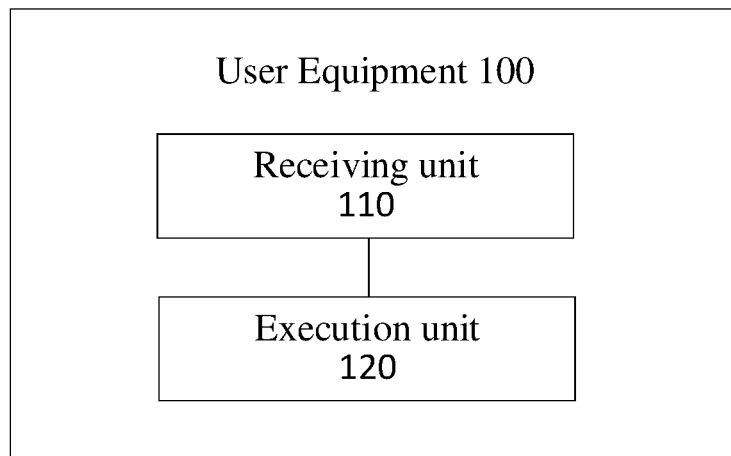
FIG. 3 is a schematic block diagram of a user equipment according to an implementation of this application.

FIG. 3 is a schematic block diagram of a user equipment 100 according to an implementation of this application. As shown in FIG. 3, the user equipment 100 includes:

a receiving unit 110, configured to receive first information indicating that measurement relaxation on a high priority frequency is allowed;

a execution unit 120, configured to perform measurement relaxation on the high priority frequency according to the first information.

Optionally, in some implementations, the execution unit 120 is further configured to when a relaxed measurement criterion is fulfilled, performing measurement relaxation on the high priority frequency after receiving the first information.

Optionally, in some implementations, the relaxed measurement criterion is fulfilled include: the relaxed measurement criterion is fulfilled for a period.

Optionally, in some implementations, the relaxed measurement criterion is fulfilled for a period include: a measurement of the serving cell of the UE satisfies the relaxed measurement criterion for a period.

Optionally, in some implementations, the measurement of the serving cell includes least one of the followings: Reference Signal Received Power (RSRP), Reference Signal Received Quality (RSRQ), Signal to Interference plus Noise Ratio (SINR).

Optionally, in some implementations, the relaxed measurement criterion is a low-mobility criterion.

Optionally, in some implementations, performing measurement relaxation on the high priority frequency refers to one of the followings: the UE not performing measurement on the high priority frequency; the UE performing measurement on the high priority frequency using a longer measurement period or sampling interval than that of a normal measurement on the high priority frequency.

Optionally, in some implementations, the high priority frequency refers to a frequency whose cell reselection priority is higher than the cell reselection priority of the frequency of the serving cell.

Optionally, in some implementations, the high priority frequency refers to a frequency of an inter-frequency reselection or a frequency of an inter Radio Access Technology (inter-RAT) frequency reselection.

Optionally, in some implementations, the first information is configured by a network side device.

Optionally, in some implementations, the first information is in first system information broadcasted by the network side device.

Optionally, in some implementations, the first system information is at least one of the followings: a master information block (MIB), a system information block (SIB), minimum system information (MSI), remaining minimum system information (RMSI).

A network device provided according to an implementation of this application. The network device includes:

a sending unit, configured to send first information to a user equipment; wherein the first information indicating that measurement relaxation, performing by the user equipment, on a high priority frequency is allowed.

Optionally, in some implementations, wherein the high priority frequency refers to a frequency whose cell reselection priority is higher than the cell reselection priority of the frequency of the serving cell.

Optionally, in some implementations, wherein the high priority frequency refers to a frequency of an inter-frequency reselection or a frequency of an inter Radio Access Technology (inter-RAT) frequency reselection.

Optionally, in some implementations, wherein the first information is configured by a network side device.

Optionally, in some implementations, wherein the first information is in first system information broadcasted by the network side device.

Optionally, in some implementations, the first system information is at least one of the followings: a master information block (MIB), a system information block (SIB), minimum system information (MSI), remaining minimum system information (RMSI).

Figure 4:
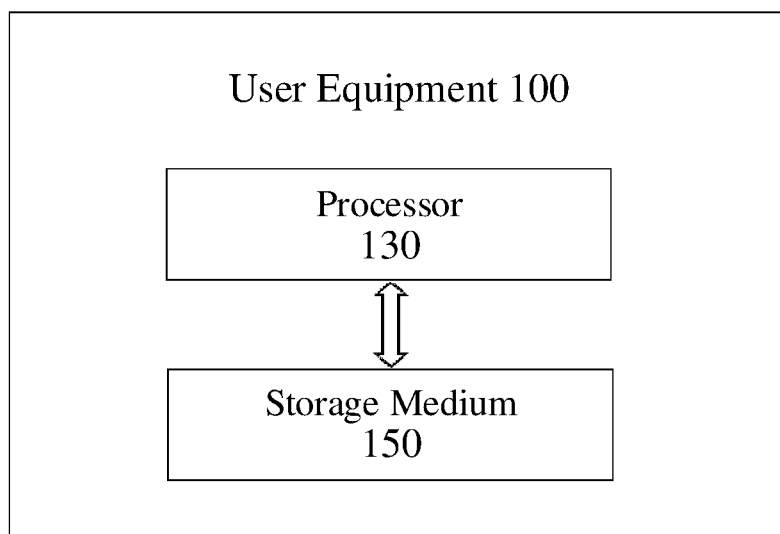
FIG. 4 is a schematic block diagram of a user equipment according to another implementation of this application.

The UE 100 may comprises one or more storage medium 150 storing computer readable instructions, and one or more computing processors 130 configured to execute the computer readable instructions for performing one of the above methods, for example as shown in FIG. 4.

The network side device comprises a processor and a memory, wherein the memory is configured to store a computer program, and the processor is configured to invoke and run the computer program stored in the memory, to perform the above methods.

It is provided a computer program, comprising instructions, when executed by user equipment, for causing the user equipment to perform one of the above methods.

It is provided a computer readable medium, comprising instructions for causing a user equipment to perform one of the above methods.

Clauses

1. A method for measurement relaxation, comprising:
receiving, by User Equipment (UE), first information from a network side device indicating that measurement relaxation on a higher priority frequency is allowed;
performing, by the UE, measurement relaxation on the higher priority frequency.

2. The method of clause 1, comprising:
performing, by the UE, measurement relaxation on the higher priority frequency, when a measurement of the serving cell of the UE satisfies a relaxed measurement criterion for a period being equal to or greater than a time threshold.

3. The method of clause 1 or 2, wherein
performing, by the UE, measurement relaxation on the higher priority frequency refers to one of the followings:
the UE not performing measurement on the higher priority frequency;
the UE performing measurement on the higher priority frequency using a longer measurement period or sampling interval than that of a normal measurement on the higher priority frequency.

4. The method of any of preceding clauses, wherein the first information is in first system information broadcast from the network side device.

5. The method of clause 4, wherein the first information is a cell reselection parameter highPriorityMeasRelax with a value of "true" in the first system information.

6. The method of any of the preceding clauses, wherein the higher priority frequency refers to a frequency whose cell reselection priority is higher than the cell reselection priority of the frequency of the serving cell.

7. The method of clause 6, wherein the higher priority frequency refers to a frequency of an inter-frequency reselection or a frequency of an inter Radio Access Technology (inter-RAT) frequency reselection.

8. The method of any one of clauses 2 to 7, wherein the relaxed measurement criterion is at least one of the followings: a low-mobility criterion, a not-at-cell-edge criterion.

9. The method of any one of clauses 2 to 8, wherein
the measurement of the serving cell includes least one of the followings: Reference Signal Received Power (RSRP), Reference Signal Received Quality (RSRQ), Signal to Interference plus Noise Ratio (SINR).

10. The method of clause 9, wherein the RSRQ is a measured cell quality value,

11. The method of any of clauses 2 to 8, wherein
the measurement of the serving cell refers to a cell selection received level value Srxlev of the serving cell.

12. The method of clause 11, wherein the Srxlev is based on a Reference Signal Received Power (RSRP).

13. The method of clause 9 or 12, wherein the RSRP is a measured cell received level value.

14. The method of clause 11 or 12, wherein the low-mobility criterion is $$(Srxlev_{Ref} - Srxlev_{Current}) < S_{SearchDeltaP},$$

where
$Srxlev_{Current}$ is a current Srxlev value of the serving cell,
$Srxlev_{Ref}$ is a reference Srxlev value of the serving cell, and
$S_{SearchDeltaP}$ is a threshold on Srxlev variation for measurement relaxation.

15. The method of clause 14, wherein the $S_{SearchDeltaP}$ is a cell reselection parameter in second system information broadcast from the network side device.

16. The method of clause 14 or 15, wherein the time threshold is a cell reselection parameter $T_{SearchDeltaP}$ for specifying the Srxlev threshold for relaxed measurement in third system information broadcast from the network side device.

17. The method of any one of clauses 4, 5, 15, 16, wherein
each of the first system information, the second system information and the third system information is at least one of the followings: a master information block (MIB), a system information block (SIB), minimum system information (MSI), remaining minimum system information (RMSI), or other system information;
the first system information, the second system information and the third system information are the same system information, or two or more different system information.

18. The method of any of preceding clauses, wherein the network side device is a based station.

19. The method of clause 18, wherein the based station is the base station of the serving cell.

20. The method of clause 18 or 19, wherein the based station is an eNodeB in a Long Term Evolution (LTE) system and/or a gNodeB in New Radio (NR) in a 5G system.

21. User equipment (UE), configured to perform the method of any of the preceding clauses.

22. The user equipment of clause 21, comprising one or more storage medium storing computer readable instructions, and one or more computing processors configured to execute the computer readable instructions for performing the method of any one of clauses 1 to 21.

23. A computer program, comprising instructions, when executed by user equipment, for causing the user equipment to perform the method according to any one of clauses 1 to 21.

24. A computer readable medium, comprising instructions for causing user equipment to perform the method of any one of clauses 1 to 21.

It should be understood that the disclosure is not limited by any of the details of the foregoing description, but rather should be construed broadly based on the principle as defined in the appended claims. Therefore, all changes and modifications that fall within the scope of the claims, or equivalences thereof are intended to be embraced by the scope of protection.

The invention claimed is:

1. A method for measurement relaxation, comprising:
receiving, by User Equipment (UE), first information indicating measurement relaxation on a high priority frequency;
performing, by the UE, measurement relaxation on the high priority frequency according to the first information when:
the first information indicates that the measurement relaxation on the high priority frequency is allowed; and
a low-mobility criterion is fulfilled for a period.

2. The method of claim 1, comprising:
when a relaxed measurement criterion is fulfilled, performing measurement relaxation on the high priority frequency after receiving the first information.

3. The method of claim 2, wherein the relaxed measurement criterion is fulfilled comprising:
the relaxed measurement criterion is fulfilled for a period.

4. The method of claim 2, wherein the relaxed measurement criterion is fulfilled for a period comprising:
a measurement of the serving cell of the UE satisfies the relaxed measurement criterion for a period.

5. The method of claim 4, wherein
the measurement of the serving cell includes least one of the followings: Reference Signal Received Power (RSRP), Reference Signal Received Quality (RSRQ), Signal to Interference plus Noise Ratio (SINR).

6. The method of claim 2, wherein the relaxed measurement criterion is a low-mobility criterion.

7. The method of claim 1, where performing measurement relaxation on the high priority frequency refers to one of the followings:
the UE not performing measurement on the high priority frequency;
the UE performing measurement on the high priority frequency using a longer measurement period or sampling interval than that of a normal measurement on the high priority frequency.

8. The method of claim 1, wherein the high priority frequency refers to a frequency whose cell reselection priority is higher than the cell reselection priority of the frequency of the serving cell.

9. The method of claim 1, wherein the high priority frequency refers to a frequency of an inter-frequency reselection or a frequency of an inter Radio Access Technology (inter-RAT) frequency reselection.

10. The method of claim 1, wherein the first information is configured by a network side device.

11. The method of claim 1, wherein the first information is in first system information broadcasted by a network side device.

12. The method of claim 11, wherein
the first system information is at least one of the followings: a master information block (MIB), a system information block (SIB), minimum system information (MSI), remaining minimum system information (RMSI).

13. The method of claim 11, wherein the network side device is a based station.

14. The method of claim 13, wherein the based station is the base station of the serving cell.

15. The method of claim 13, wherein the based station is an eNodeB in a Long Term Evolution (LTE) system and/or a gNodeB in New Radio (NR) in a 5G system.

16. A user equipment (UE), comprising: a processor and a storage medium, wherein the storage medium is configured to store a computer program, and the processor is configured to invoke and run the computer program stored in the storage medium to
receive first information indicating measurement relaxation on a high priority frequency; and
perform measurement relaxation on the high priority frequency according to the first information when:
the first information indicates that the measurement relaxation on the high priority frequency is allowed; and
a low-mobility criterion is fulfilled for a period.

17. A method for measurement relaxation, comprising:
sending, by a network side device, first information to a user equipment;
wherein the first information indicates measurement relaxation, performing by the user equipment, on a high priority frequency;
wherein the first information is for the user equipment to perform the measurement relaxation on the high priority frequency when:
the first information indicates that the measurement relaxation on the high priority frequency is allowed; and
a low-mobility criterion is fulfilled for a period.

18. The method of claim 17, wherein the high priority frequency refers to a frequency whose cell reselection priority is higher than the cell reselection priority of the frequency of the serving cell.

19. A network side device, comprising: a processor and a memory, wherein the memory is configured to store a computer program, and the processor is configured to invoke and run the computer program stored in the memory to
send first information to a user equipment;
wherein the first information indicates measurement relaxation, performing by the user equipment, on a high priority frequency;
wherein the first information is for the user equipment to perform the measurement relaxation on the high priority frequency when:
the first information indicates that the measurement relaxation on the high priority frequency is allowed; and
a low-mobility criterion is fulfilled for a period.

20. A non-transitory computer readable medium, comprising instructions for causing user equipment to perform the method of claim 1.

* * * * *